US012589417B2

(12) United States Patent
Trinkle et al.

(10) Patent No.: US 12,589,417 B2
(45) Date of Patent: Mar. 31, 2026

(54) PRESSURE WASHER

(71) Applicant: Andreas Stihl AG & Co. KG, Waiblingen (DE)

(72) Inventors: Simon Trinkle, Kaisersbach (DE); Michael Renz, Stuttgart (DE); Christopher Tost, Auenwald (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 15 days.

(21) Appl. No.: 18/393,299

(22) Filed: Dec. 21, 2023

(65) Prior Publication Data

US 2024/0207902 A1 Jun. 27, 2024

(30) Foreign Application Priority Data

Dec. 22, 2022 (EP) .................................... 22216017

(51) Int. Cl.

| | |
|---|---|
| ***B05B 7/12*** | (2006.01) |
| ***B05B 7/32*** | (2006.01) |
| ***B05B 12/00*** | (2018.01) |
| ***B08B 3/02*** | (2006.01) |

(52) U.S. Cl.

CPC ................ *B08B 3/028* (2013.01); *B05B 7/12* (2013.01); *B05B 7/32* (2013.01); *B05B 12/00* (2013.01); *B08B 3/026* (2013.01); *B08B 2203/0205* (2013.01); *B08B 2203/0217* (2013.01); *B08B 2203/0223* (2013.01); *B08B 2203/027* (2013.01)

(58) Field of Classification Search

None

See application file for complete search history.

(56) References Cited

U.S. PATENT DOCUMENTS

| | | | | |
|---|---|---|---|---|
| 4,569,483 | A | 2/1986 | Oberdorfer | |
| 5,310,113 | A | 5/1994 | Cowgur | |
| 5,381,962 | A | 1/1995 | Teague | |
| 5,529,460 | A * | 6/1996 | Eihusen ................ | F04B 49/022 417/20 |
| 6,003,782 | A | 12/1999 | Kim et al. | |
| 6,009,953 | A | 1/2000 | Laskaris et al. | |
| 9,016,291 | B2 | 4/2015 | Kelle et al. | |
| 2010/0038098 | A1 | 2/2010 | Groonwald et al. | |
| 2011/0023918 | A1 | 2/2011 | Kelle et al. | |
| 2013/0140376 | A1 | 6/2013 | Ballu | |
| 2017/0304873 | A1 | 10/2017 | Luby et al. | |
| 2017/0361357 | A1 | 12/2017 | Raasch et al. | |
| 2020/0246821 | A1 | 8/2020 | Nolte et al. | |

FOREIGN PATENT DOCUMENTS

| | | | |
|---|---|---|---|
| DE | 195 21 536 | A1 | 12/1996 |
| EP | 0 059 216 | A1 | 9/1982 |
| EP | 2 237 900 | A2 | 10/2010 |

(Continued)

*Primary Examiner* — Levon J Shahinian

(74) *Attorney, Agent, or Firm* — Walter Ottesen, P.A.

(57) ABSTRACT

A pressure washer has a connection for a source of liquid; a high pressure pump; a main line by way of which liquid via the high pressure pump is conveyable from the connection to a spray opening of the main line; and a supplemental pump for adding an additive to the liquid. The pressure washer is conceived in such a way that the additive by way of the supplemental pump is able to be fed to the main line upstream of the high pressure pump.

17 Claims, 2 Drawing Sheets

(56) References Cited

FOREIGN PATENT DOCUMENTS

| | | | |
|---|---|---|---|
| EP | 3 708 259 | B1 | 4/2022 |
| GB | 1160532 | A | 8/1969 |
| IT | 201800007002 | A1 | 1/2020 |
| WO | 2016/090029 | A1 | 6/2016 |
| WO | 2022/212555 | A1 | 10/2022 |

* cited by examiner

PRESSURE WASHER

CROSS-REFERENCE TO RELATED APPLICATIONS

This application claims priority of European patent application no. 22216017.8, filed Dec. 22, 2022, the entire content of which is incorporated herein by reference.

BACKGROUND

Known from DE 195 21 536 A1 is a pressure washer in which—in addition to the pump by way of which the water to be sprayed is pressurized—a metering pump for adding detergent to the water to be sprayed is also provided. In order for detergent to be added, the pressure washer has to be operated in a low-pressure mode. Switching to the low-pressure mode is inconvenient, and cleaning objects using a high water pressure and a simultaneously added detergent is not possible.

SUMMARY

It is an object of the disclosure to refine a pressure washer in such a manner that it is possible to add detergent in a comfortable and cost-effective manner.

This object is, for example, achieved by a pressure washer including: a connection for a source of liquid; a high pressure pump; a main line by way of which liquid is conveyable via the high pressure pump from the connection to a spray opening of the main line; and, a supplemental pump for adding an additive to the liquid, wherein the additive by way of the supplemental pump is feedable to the main line upstream of the high pressure pump.

According to the disclosure, a pressure washer is conceived in such a way that the additive by way of the supplemental pump is able to be fed to the main line upstream of the high pressure pump. As a result of the supplemental pump being disposed upstream of the high pressure pump, the supplemental pump has to work counter to a much lower pressure in the main line than is the case when the supplemental pump is disposed downstream of the high pressure pump. As a result, a much lower pump output is required for adding the additive by the supplemental pump. This enables adding even during operation of the high pressure pump. Inconvenient switching to a low-pressure mode is not necessary. As a result, it is possible to add detergent in a comfortable manner. As a result of the supplemental pump being disposed upstream of the high pressure pump in the main line, cost-effective adding is possible because there is no need for a supplemental pump with a high pump output for this purpose. A supplemental pump which is conceived for a lower pump output can be used. In pumps of this type, the volumetric flow conveyed by the pump is more precisely adjustable than in pumps with a higher pump output. The pressure washer can be produced in a cost-effective manner by using a supplemental pump with a lower pump output. A supplemental pump of a smaller construction volume can be installed by using a supplemental pump with a lower pump output. Installation space can be saved as a result. The weight of the pressure washer can be kept low by using a supplemental pump with a lower pump output, because a pump with a lower pump output weighs less.

A Venturi nozzle for inducting additive in the main line can be dispensed with by using a supplemental pump for adding the additive. As a result, the liquid in the main line can be sprayed at a comparatively high pressure. When a Venturi nozzle is disposed in the main line, the pressure of the liquid is limited by the Venturi nozzle. A Venturi nozzle can be dispensed with by adding detergent via a supplemental pump, according to the disclosure. The pressure losses otherwise associated with a Venturi nozzle can be avoided as a result.

The additive by way of the supplemental pump is in particular able to be fed directly to the main line upstream of the high pressure pump. The additive makes its way directly into the region of the main line upstream of the high pressure pump, without passing the region of the main line downstream of the high pressure pump beforehand.

The main line expediently has a suction chamber between the connection and the high pressure pump. The main line expediently has a pressure chamber between the high pressure pump and the spray opening. An outlet of the supplemental pump is advantageously fluidically connected to the suction chamber. This results in a simple construction in terms of the configuration of the pressure washer.

In an embodiment of the disclosure it is provided that the pressure chamber is fluidically connected to the suction chamber by way of a bypass line. A bypass valve is in particular disposed in the bypass line. A free cross-sectional area of the bypass line is adjustable via the bypass valve for regulating the pressure in the pressure chamber. The larger the free cross-sectional area of the bypass line, the larger the volumetric flow of the cleaning liquid that can flow through the bypass line at otherwise unchanged conditions. As a result of the pressure in the pressure chamber being regulated via a bypass valve, the pressure washer can be produced in a cost-effective manner. The pressure is regulated entirely independently of the type of motor used. Accordingly, a cost-effective motor can be used, and the pressure can be regulated at the same time. A cost-intensive speed controller for a motor can be dispensed with as a result. Expensive measures such as, for example, the integration of a frequency inverter, or the implementation of a phase angle control unit, are not required. The use of a directly driven asynchronous motor with a corresponding speed controller can be dispensed with in particular.

It may also be provided that the pressure in the pressure chamber is regulated as a function of the rotating speed of the motor for the high pressure pump. No bypass line is provided in this case.

The pressure washer can advantageously have a further operator-controlled element for controlling the supplemental pump. As a result, the supplemental pump can be controlled by the operator in a simple manner. As a result, adding the additive to the liquid conveyed in the main line is possible at any time by controlling the supplemental pump via the further operator-controlled element. When the further operator-controlled element is activated, the supplemental pump conveys the additive into the main line of the pressure washer.

A main line valve for adjusting a free cross-sectional area of the main line is expediently disposed in the main line. The main line valve is operable in particular via an operator-controlled element. The further operator-controlled element can advantageously have an activated state in which an operation of the supplemental pump is possible. No operation of the supplemental pump is expediently possible in a deactivated state of the operator-controlled element. The pressure washer can advantageously be conceived in such a way that the supplemental pump is operated only if the further operator-controlled element is in the activated state and the operator-controlled element is simultaneously activated. In other words, additive can be conveyed into the main line via the supplemental pump only if the main line valve of the main line is simultaneously open and liquid is sprayed out of the spray opening. It is prevented as a result that additive is unnecessarily conveyed into the main line.

In an embodiment of the disclosure, the quantity, in particular the volume, of the additive fed to the main line is able to be influenced via the further operator-controlled element. The quantity, in particular the volume, of the additive fed to the main line is able to be influenced in particular as a function of the position of the further operator-controlled element. Via the further operator-controlled element, a signal is expediently transmittable to a control unit which, in a manner corresponding to the signal, adjusts the quantity, in particular the volume, of the additive fed to the main line, by actuating the supplemental pump.

It can be provided that a plurality of stages in which the quantities, in particular the volumes, of the additive fed to the main line differ are adjustable via the further operator-controlled element. As a result, it is possible, for example, to perform a preliminary adjustment on the further operator-controlled element and in this way select a corresponding stage. The further operator-controlled element then does not have to be additionally depressed when the operator-controlled element is activated. The supplemental pump then conveys the additive in a manner corresponding to the quantity, in particular corresponding to the volume, of the additive to be fed to the main line, as preadjusted by the further operator-controlled element. This allows the additive to be added in a comfortable manner. It can also be provided that the further operator-controlled element is adjustable in a stepless, in particular continuous, manner. In this instance, the quantity, in particular the volume, of the additive fed to the main line can also be adjusted in a stepless, in particular continuous, manner.

The delivery rate, in particular the power input, of the supplemental pump can advantageously be adjustable via the further operator-controlled element. This can take place, for example, via pulse width modulation of the electric power fed to the supplemental pump. In this instance, the pulse width can be adjusted as a function of the position of the further operator-controlled element. For example, the pulse width can be chosen to be smaller the larger the actuating distance traveled by the further operator-controlled element. Or else, the pulse width can be adjusted as a function of a stage selected via the further operator-controlled element. For example, the pulse width can be chosen to be smaller the higher the number of the selected stage. In particular, at least three stages, preferably exactly three stages, are provided. The adjustment of the delivery rate, in particular of the power input, of the supplemental pump can also take place by way of adjusting an operating frequency of the supplemental pump. The adjustment of the delivery rate, in particular of the power input, of the supplemental pump, can also take place by way of a phase angle control unit.

In particular, the pressure washer has a hand-guidable spray unit. The spray opening is expediently disposed on the hand-guidable spray unit. The further operator-controlled element can advantageously be disposed on the hand-guidable spray unit. As a result, the spray unit can be guided so as to direct a liquid jet exiting by way of the spray opening onto a specific object, and the further operator-controlled element can be simultaneously operated. The quantity of the additive to be added, in particular the volume of the latter, can in particular be adjusted via the further operator-controlled element in the process. The spray unit expediently includes a hand gun on which the further operator-controlled element and the spray opening are disposed. It can be provided that the spray unit is formed exclusively by the hand gun. However, it can also be provided that the spray unit includes a hand gun and a lance, and that the further operator-controlled element is disposed on the hand gun, and the spray opening is disposed on the lance.

In an embodiment of the disclosure, the pressure washer is conceived in such a way that the pump output of the supplemental pump is greater at a higher pressure in the main line upstream of the high pressure pump. As a result, pressure fluctuations in the main line upstream of the high pressure pump can be compensated for by the pump output of the supplemental pump, the latter being adapted to the former. As a result, it is possible to always convey the desired quantity, in particular the desired volume, of additive into the main line via the supplemental pump, even in the event of a fluctuating or dissimilar pressure in the main line upstream of the high pressure pump. It can be ensured in particular as a result that one and the same position of the further operator-controlled element is always associated with the same quantity, in particular the same volume, of additive fed to the main line. The quantity, or the volume, of the added additive can be kept constant independently of the pressure fluctuations in the main line, for example in the event of a higher supply pressure in the water supply network.

An inlet of the supplemental pump is expediently fluidically connected to a container for the additive. As a result, the additive can be fed to the supplemental pump in a simple manner. The container is in particular held so as to be replaceable in the pressure washer. As a result, the container for additive can be replaced in a simple manner when the additive has been consumed. It can also be provided that the container is configured to be refillable.

In an embodiment of the disclosure, the pressure washer has a supplemental valve. The supplemental valve prevents liquid from the main line advancing into the container. This is particularly important when the supplemental pump does not deliver any or only a very small pump output. In this instance, the supplemental valve prevents that liquid from the main line is forced into the container.

The pressure washer can advantageously have a backflow inhibitor. The backflow inhibitor prevents that the additive can leak from the main line in the direction of the source of liquid via the connection for the source of liquid. It is ensured in this way that the supplemental pump does not pump the additive to the source of liquid. A contamination of the source of liquid can be prevented as a result. Additive is not unnecessarily lost as a result. A check valve can also be provided instead of the backflow inhibitor.

The supplemental pump can advantageously be a magnetic piston pump. The supplemental pump can be of a particularly compact configuration as a result. Only a small installation space is occupied by the supplemental pump as a result. An overall compact configuration of the pressure washer is made possible as a result. The magnetic piston pump is in particular a vibration pump. However, it can also be provided that the supplemental pump is a magnetic piston diaphragm pump.

The additive is in particular a detergent solution. Effective cleaning of the items impacted by the liquid jet is thus possible via the liquid sprayed from the spray opening.

BRIEF DESCRIPTION OF DRAWINGS

The invention will now be described with reference to the drawings wherein.

DETAILED DESCRIPTION

Figure 1:
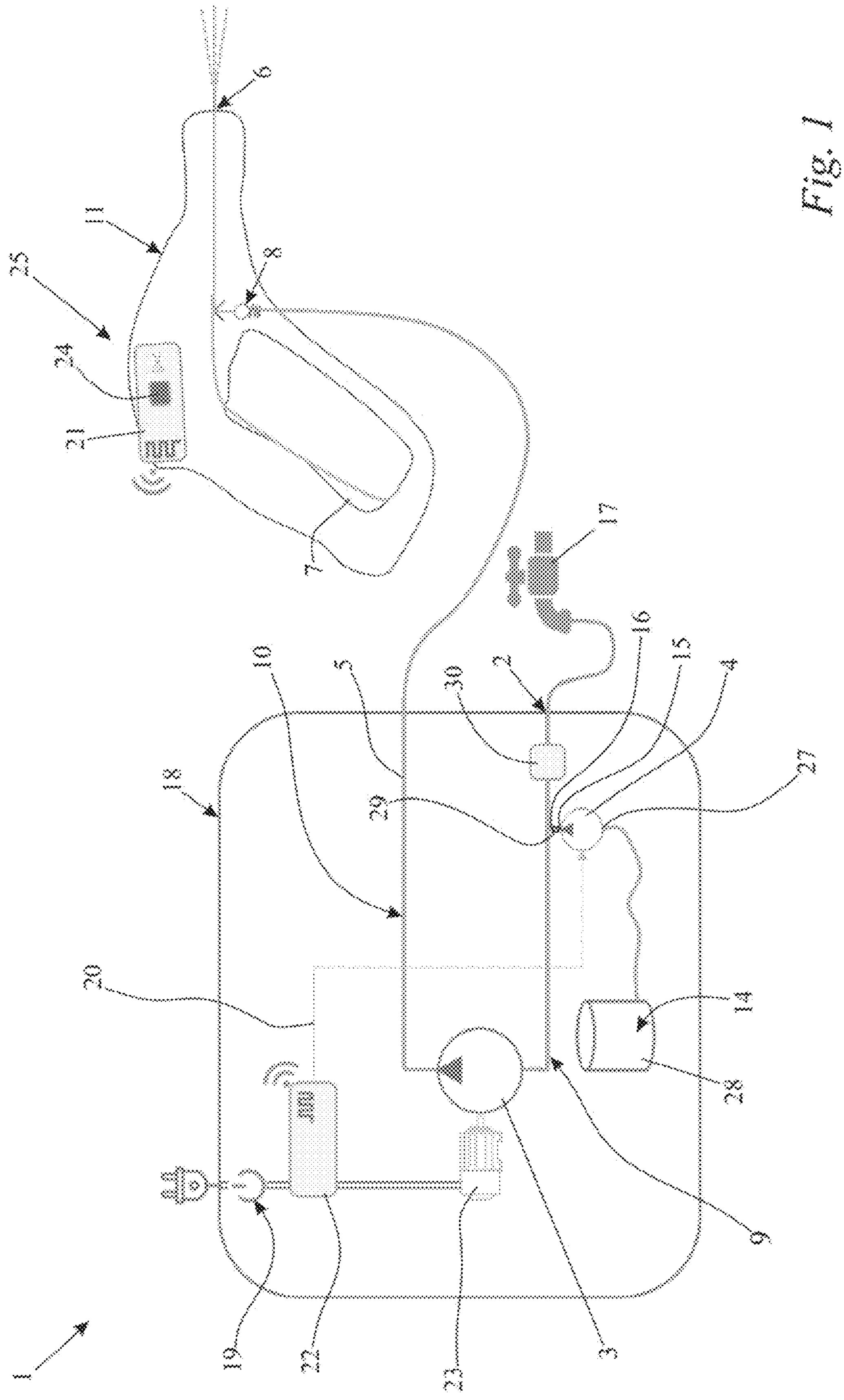
FIG. 1 shows a schematic illustration of a pressure washer having a supplemental pump for adding an additive to the liquid in the main line upstream of a high pressure pump; and, FIG. 2 shows a schematic illustration of a pressure washer having a supplemental pump for adding an additive to the liquid in the main line upstream of the high pressure pump, and having a bypass line between the pressure chamber and the suction chamber, a bypass valve being disposed in the bypass line.
Figure 2:
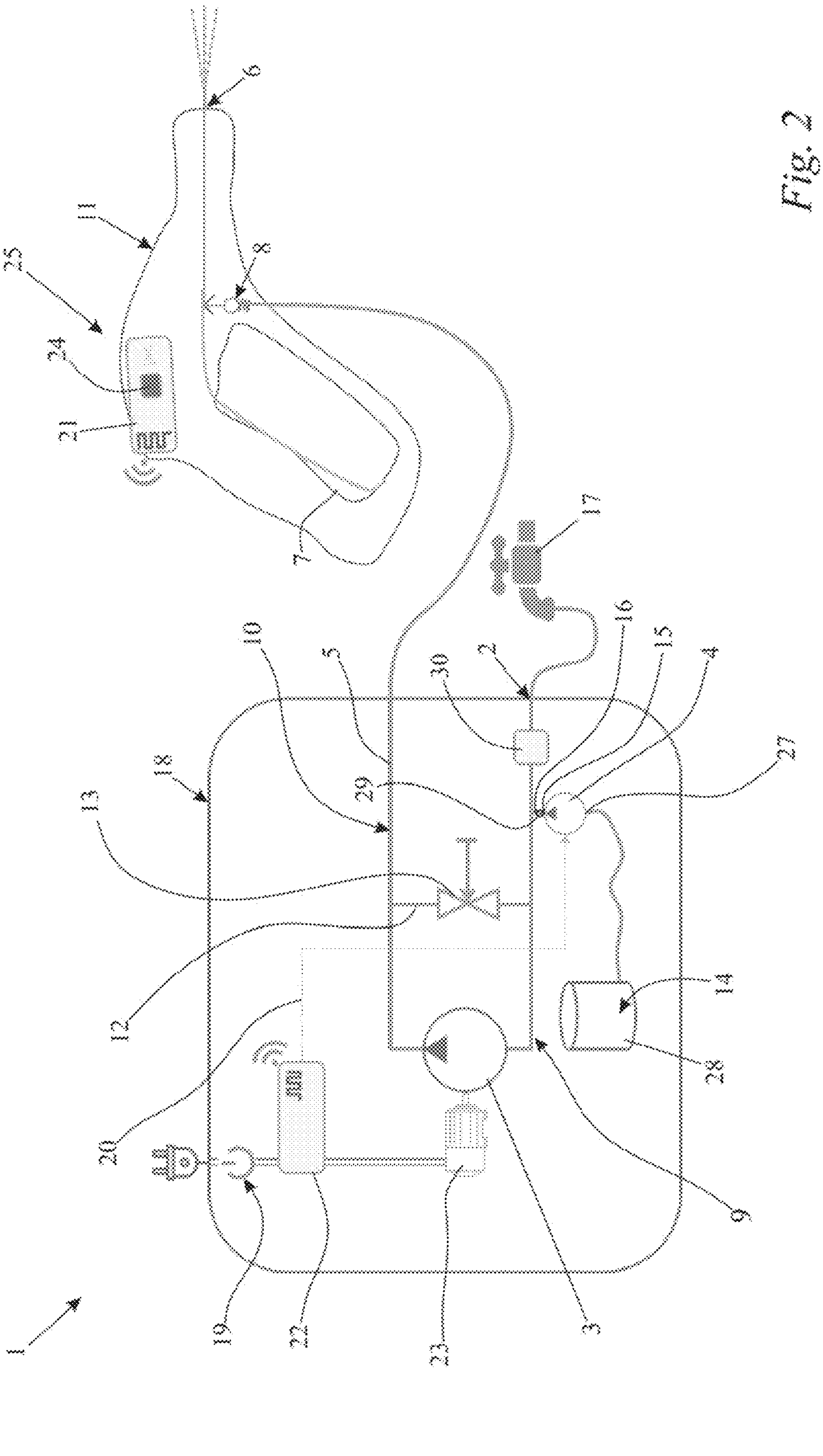

FIGS. 1 and 2 show a pressure washer 1. The pressure washer 1 is mobile. The pressure washer 1 is movable. The pressure washer 1 is able to be pushed by an operator. In particular, the pressure washer 1 weighs less than 40 kg.

The pressure washer 1 includes a pump unit 18 and a spray unit 11. The pump unit 18 and the spray unit 11 are fluidically connected to one another by way of a main line 5. The spray unit 11 in the embodiment consists of a hand gun. However, it can also be provided that the spray unit includes a hand gun and a lance.

The pressure washer 1 includes a connection 2 for a source of liquid 17. The source of liquid 17 in the embodiment is an external source of liquid. The external source of liquid in the embodiment is the water tap of a domestic water supply network. However, the external source of liquid may also be a cistern, a body of water, or an external water container such as, for example, a rainwater barrel. It can also be provided that the source of liquid is a constituent part of the pressure washer. In this case, a container is provided for the liquid. The container can be an integral constituent part of the pressure washer. However, the container can also be held so as to be replaceable in the pressure washer.

The pressure washer 1 includes a spray opening 6. The pressure washer 1 includes the main line 5. The main line 5 of the pressure washer 1 fluidically connects the connection 2 and the spray opening 6. The connection 2 is disposed on the pump unit 18. The spray opening 6 is disposed on the spray unit 11. In the embodiment, the spray opening 6 is disposed on the spray unit 11 which is configured as a hand gun. However, it can also be provided that the spray opening is disposed on a replaceable lance of the spray unit.

The pressure washer 1 includes a high pressure pump 3. Via the high pressure pump 3, liquid is conveyable from the connection 2 to the spray opening 6 by way of the main line 5. The source of liquid 17 feeds liquid to the main line 5. The high pressure pump 3 is disposed in the main line 5. The high pressure pump 3 is disposed in the main line 5 between the connection 2 and the spray opening 6. The high pressure pump 3 pressurizes the liquid.

The pressure washer 1 includes a supplemental pump 4. The supplemental pump 4 serves for adding an additive 14 to the liquid. The additive 14 in the embodiments is a detergent solution. The pressure washer 1 is conceived in such a way that the additive 14 is able to be fed to the main line 5 by the supplemental pump 4 upstream of the high pressure pump 3. The additive 14 is fed directly to the main line 5 upstream of the high pressure pump 3. The additive 14 makes its way from the supplemental pump 4 directly into the region of the main line 5 upstream of the high pressure pump 3, without passing the region of the main line 5 downstream of the high pressure pump 3 beforehand.

The main line 5 has a suction chamber 9 and a pressure chamber 10. The high pressure pump 3 is disposed between the suction chamber 9 and the pressure chamber 10 of the main line 5. The main line 5 has the suction chamber 9 between the connection 2 and the high pressure pump 3. The main line 5 has the pressure chamber 10 between the high pressure pump 3 and the spray opening 6. The suction chamber 9 is disposed upstream of the high pressure pump 3. The pressure chamber 10 is disposed downstream of the high pressure pump 3. In the embodiments, the suction chamber 9 is formed by a portion of the main line 5 between the connection 2 and the high pressure pump 3. In the embodiments, the pressure chamber 10 is formed by a portion of the main line 5 between the high pressure pump 3 and the spray opening 6. The high pressure pump 3 conveys liquid from the suction chamber 9 to the pressure chamber 10. During operation of the high pressure pump 3, a higher pressure prevails in the pressure chamber 10 than in the suction chamber 9. The suction chamber 9 and the pressure chamber 10 are a constituent part of the main line 5. During operation of the high pressure pump 3, a higher pressure prevails downstream of the high pressure pump 3 in the main line 5 than upstream of the high pressure pump 3.

The high pressure pump 3 is disposed in the pump unit 18. The high pressure pump 3 is configured to be separate from the spray unit 11. Various spray units can be connected to the high pressure pump 3. The pressure washer 1 has a motor 23 for driving the high pressure pump 3. The motor 23 is disposed in the pump unit 18. The motor 23 can be configured as a brushless DC motor. A brushless DC motor is also referred to as an EC motor. The motor can also by a universal motor. The motor 23 in the embodiments is an induction motor. In an induction motor, a revolving magnetic field of the stator sets the rotor in motion. The induction motor in the embodiments is AC operated. The voltage source can be provided by the grid voltage, for example. Should an operation with batteries or rechargeable batteries be provided, the motor can also be a brushless DC motor. In this instance, it can be provided that the rechargeable battery is a constituent part of the pressure washer 1.

As is illustrated in FIGS. 1 and 2, the pressure washer 1 includes a main switch 19. The main switch 19 serves for interrupting the voltage supply of the entire pressure washer 1. The main switch 19 is in particular disposed on the pump unit 18.

The pressure washer 1 includes a main line valve 8. The main line valve 8 is disposed in the main line 5. The main line valve 8 has two valve states. The two valve states include a closed state and an open state. In the open state, the main line valve 8 permits a flow of liquid through the main line. In the closed state, the main line valve 8 suppresses a flow of liquid through the main line 5. During operation of the pressure washer 1, liquid is sprayed from the spray opening 6 in the open state of the main line valve 8. No liquid is sprayed from the spray opening 6 in the closed state of the main line valve 8. In the embodiments, the main line valve 8 is disposed in the spray unit 11. In the embodiments, the main line valve 8 is disposed between the high pressure pump 3 and the spray opening 6. However, it can also be provided that the main line valve is disposed in the pump unit. It can also be provided that the main line valve is disposed between the connection and the high pressure pump.

The pressure washer 1 has an operator-controlled element 7. The operator-controlled element 7 is configured to be separate from the main switch 19. The main line valve 8 is able to be switched between the open state and the closed state via the operator-controlled element 7. In the embodiments, the operator-controlled element 7 is disposed on the spray unit 11.

The spray unit 11 is movable relative to the pump unit 18. In the embodiment, the main line 5 between the pump unit 18 and the spray unit 11 is configured as a flexible hose. The spray opening 6 is disposed on the spray unit 11. The spray unit 11 by way of the spray opening 6 thereof can be directed onto an object to be cleaned. The spray unit 11 is guidable by hand. The operator-controlled element 7 is disposed on the spray unit 11. A user can guide the spray unit 11 with one hand, and simultaneously operate the operator-controlled element 7 with the same hand.

The supplemental pump 4 has an outlet 15, as is illustrated in FIGS. 1 and 2. The outlet 15 of the supplemental pump 4 is fluidically connected to the suction chamber 9 of the main line 5. In the embodiments, the pressure washer 1 includes a stub line 16. The stub line 16 is disposed between the outlet 15 and the main line 5. The outlet 15 of the supplemental pump 4 and the main line 5 are fluidically connected via the stub line 16.

It can be provided that the supplemental pump includes a rotationally driven motor. This is not the case in the embodiments.

The pressure washer 1 has a further operator-controlled element 24. The further operator-controlled element 24 serves for controlling the supplemental pump 4, in particular in terms of controlling a pump output of the supplemental pump 4. It can also be provided that the further operator-controlled element serves for controlling a motor for the supplemental pump. The further operator-controlled element 24 is disposed on the spray unit 11. The further operator-controlled element 24 is disposed on the spray unit 11 in such a manner that a user can guide the spray unit 11 with one hand, and can simultaneously operate the further operator-controlled element 24 with the same hand.

The pressure washer 1 is conceived in such a way that the quantity of the additive 14 fed to the main line 5 can be influenced via the further operator-controlled element 24. In the embodiments, a plurality of stages are adjustable via the further operator-controlled element 24. In the plurality of stages, the quantity, in particular the volume, of the additive 14 fed to the main line 5 may differ. However, it may also be provided that the quantity, in particular the volume, of the additive 14 fed to the main line 5 via the further operator-controlled element 24 is adjustable continuously, in particularly in a stepless manner.

In the embodiments, the power input of the supplemental pump 4 is adjustable via the further operator-controlled element 24. It can also be provided that the power input of a motor for the supplemental pump is adjustable via the further operator-controlled element 24.

The power input of the supplemental pump 4 is advantageously adjustable via pulse width modulation. Here, the power input is permitted only at temporal intervals, that is, the so-called pulses. The power input is suppressed between two pulses. It can also be provided that the power input of a motor of the supplemental pump is adjustable via pulse width modulation.

The pressure washer 1 includes a transmitting unit 21. The pressure washer 1 includes a control unit 22. The transmitting unit 21 is disposed on the spray unit 11. The control unit 22 is disposed in the pump unit 18. The pressure washer 1 is conceived in such a way that the state of the further operator-controlled element 24 is transmitted to the control unit 22 via the transmitting unit 21. In the embodiments, this takes place via an electromagnetic signal. The electromagnetic signal is transmitted from the transmitting unit 21 to the control unit 22. However, it can also be provided that the state of the further operator-controlled element 24 is transmitted from the transmitting unit to the control unit via an electric signal. In this case, the transmitting unit 21 can be connected to the control unit 22 by way of an electrical cable. The control unit 22 controls the supplemental pump 4, in particular the power input of the supplemental pump 4, as a function of the signal received from the transmitting unit 21. It can also be provided that the control unit 22 controls a motor for the supplemental pump, in particular the power input of a motor for the supplemental pump, as a function of the signal received from the transmitting unit 21.

For this purpose, the control unit 22 transmits a signal 20 to the supplemental pump 4. The signal transmitted to the supplemental pump 4 by the control unit 22 in the embodiments is an electric signal. The control unit 22 is connected to the supplemental pump 4 via an electric line. However, it can also be provided that the signal transmitted to the supplemental pump 4 by the control unit 22 is an electromagnetic signal. It can also be provided that the signal transmitted by the control unit to a motor for the supplemental pump is an electric signal.

The further operator-controlled element 24 has an activated state 25 which is illustrated in FIGS. 1 and 2. An operation of the supplemental pump 4 is possible in the activated state 25 of the further operator-controlled element 24. The further operator-controlled element 24 has a deactivated state. An operation of the supplemental pump 4 is not possible in the deactivated state of the further operator-controlled element 24. An operation of the supplemental pump 4 in the deactivated state of the further operator-controlled element 24 is not possible even when the operator-controlled element 7 is activated. It can be provided that the further operator-controlled element includes a button. In a first depressed position the further operator-controlled element is in the activated state. In a second non-depressed position the further operator-controlled element is in the deactivated state.

The pressure washer 1 is conceived in such a way that the supplemental pump is operated only if the further operator-controlled element 24 is in the activated state 25 and the operator-controlled element 7 is simultaneously activated. The supplemental pump 4 can then convey additive 14 into the main line 5 only when the main line valve 8 is opened via the operator-controlled element 7. The supplemental pump 4 conveys additive 14 into the main line 5 only when the main line valve 8 is opened via the operator-controlled element 7 and the further operator-controlled element 24 is simultaneously in the activated state 25. In this instance liquid, to which additive 14 is added, is sprayed from the spray opening 6.

It can be provided that the pressure washer 1 is conceived in such a way that the pump output of the supplemental pump 4 is greater at a higher pressure in the main line 5 upstream of the high pressure pump 3. The higher the pressure in the main line 5 upstream of the high pressure pump 3, the greater the pump output of the supplemental pump 4. In order to guarantee this correlation, a pressure gauge can be provided in the main line 5 upstream of the high pressure pump 3, in particular in the suction chamber 9. The measured values of the pressure gauge can be transmitted to the control unit 22, the latter controlling the pump output of the supplemental pump 4 according to the measured values of the pressure gauge. It can also be provided that the signal 20 transmitted from the control unit 22 to the supplemental pump 4 is determined as a function of the position of the further operator-controlled element 24 and simultaneously as a function of the pressure in the main line 5 upstream of the high pressure pump 3. In this instance, the pump output of the supplemental pump 4 adjusted as a result depends on the position of the further operator-controlled element 24 as well as on the pressure in the main line 5 upstream of the high pressure pump 3. It can be provided that the pump output of the supplemental pump 4 is increased by an offset value as a function of the pressure in the main line 5 upstream of the high pressure pump 3. The size of the offset value increases as the pressure in the main line 5 upstream of the high pressure pump 3 increases. Alternatively or additionally, it can be provided that the signal 20 transmitted from the control unit 22 to the supplemental pump 4 is a function of the position of the bypass valve 13 illustrated in FIG. 2. In particular, the signal 20 transmitted from the control unit 22 to the supplemental pump 4 can be determined as a function of the position of the bypass valve 13, illustrated in FIG. 2, and/or as a function of the pressure in the main line 5 upstream of the high pressure pump 3, and/or as a function of the position of the further operator-controlled element 24.

The delivery rate or the pump output of the supplemental pump 4 is not regulated in the embodiments.

The pump output of the supplemental pump 4 is not continuously adjustable in the embodiments. The supplemental pump 4 either operates at full output or not at all.

As is illustrated in FIGS. 1 and 2, the supplemental pump 4 includes an inlet 27. The inlet 27 of the supplemental pump 4 is fluidically connected to a container 28 for the additive 14. It can be provided that the container 28 is a constituent part of the pressure washer 1. In the embodiments, the container 28 for the additive 14 is configured to be separate from the pressure washer 1. The container 28 is held so as to be replaceable in the pressure washer 1. The container 28 is disposed in the pump unit 18.

The pressure washer 1 includes a supplemental valve 29. The supplemental valve 29 prevents liquid from the main line 5 advancing into the container 28 for the additive 14. In the embodiments, the supplemental valve 29 is disposed in the stub line 16. It can also be provided that the supplemental valve 29 is disposed in the connecting line between the container 28 and the supplemental pump 4. It can also be provided that the supplemental valve 29 is a constituent part of the supplemental pump 4.

In the embodiments, the pressure washer 1 includes a backflow inhibitor 30. The backflow inhibitor 30 prevents that the additive 14 can leak from the main line 5 in the direction of the source of liquid 17 via the connection 2 for the source of liquid 17. The backflow inhibitor 30 is disposed in the main line 5 upstream of the high pressure pump 3. The backflow inhibitor 30 is disposed in the suction chamber. The backflow inhibitor 30 is disposed in the region of the main line 5 between the supplemental pump 4 and the connection 2. The backflow inhibitor 30 is disposed between the stub line 16 and the connection 2 in the main line 5. A check valve can also be provided instead of the backflow inhibitor 30.

In the embodiments, the supplemental pump 4 is a magnetic piston pump. The magnetic piston pump is a form of pump which is driven by an oscillating armature instead of a rotating motor. The magnetic piston pump can be a diaphragm pump or a vibration pump. The supplemental pump 4 in the embodiments is a vibration pump.

In the vibration pump, an AC-operated electromagnet by way of a yoke in an internal air gap generates an oscillating magnetic field which causes a ferromagnetic armature to oscillate against a compression spring. This armature simultaneously represents the piston, liquid being able to flow through the central bore of the latter into a pump chamber of the supplemental pump 4. When the piston oscillates out of the air gap of the electromagnet due to the spring force, a valve closes the bore in the piston and a further valve opens the pump chamber of the supplemental pump 4 in the direction of the outlet 15 of the supplemental pump 4. When the piston is attracted back into the air gap by the magnetic field, the outlet valve closes again and the cycle restarts. In order for the housing of the pump unit 18 to be decoupled, the supplemental pump 4 can be mounted in the pump unit 18 via an anti-vibration element, in particular via an elastomer. However, the supplemental pump 4 can also be a magnetic piston diaphragm pump or a linear diaphragm pump.

In the embodiment as per FIG. 1 the pressure in the pressure chamber 10 is regulated as a function of the speed of the motor 23 for the high-pressure pump 4. The speed of the motor 23 can be adjusted, in particular indirectly via the control unit 22, as a function of the position of the operator-controlled element 7. No bypass line is provided in the embodiment as per FIG. 1.

The pressure washer 1 as per FIG. 2 differs from the pressure washer 1 as per FIG. 1 in that the former includes a bypass line 12. The pressure chamber 10 is fluidically connected to the suction chamber 9 by the bypass line 12. As a result of the bypass line 12, a further fluidic connection between the suction chamber 9 and the pressure chamber 10, which is separate from the fluidic connection between the suction chamber 9 and the pressure chamber 10 by way of the high pressure pump 3, is possible.

When the high pressure pump 3 is in operation, a higher pressure prevails in the pressure chamber 10 than in the suction chamber 9. By virtue of this pressure gradient, liquid can flow from the pressure chamber 10 into the suction chamber 9 by way of the bypass line 12. A bypass valve 13 is disposed in the bypass line 12. A free cross-sectional area of the bypass line 12 is adjustable via the bypass valve 13. The pressure in the pressure chamber 10 can be regulated as a result. In the case of a larger free cross-sectional area, the pressure equalization between the pressure chamber 10 and the suction chamber 9 takes place to a greater extent. If a high pressure is to prevail in the pressure chamber 10, the free cross-sectional area of the bypass line 12 is reduced via the bypass valve 13. The larger the free cross-sectional area of the bypass line 13, the larger the volumetric flow through the bypass line 13 during operation, at otherwise unchanged conditions. The bypass valve 13 can be adjusted in stages, or continuously, between a completely closed state and a completely opened state. The bypass valve 13 can have various degrees of closure between the completely closed state and the completely opened state. In the embodiments, the bypass valve 13 is continuously adjustable at least in portions. It can also be provided that the bypass valve is continuously adjustable between the completely closed state and the completely opened state.

The size of the volumetric flow of the liquid in the main line can be adjusted as a function of the degree of closure of the bypass valve 13. The more the bypass valve 13 is closed, the smaller the free cross-sectional area of the bypass line 12. The more the bypass valve 13 is closed, the larger the volumetric flow of the liquid in the main line 5. The more the bypass valve 13 is closed, the larger the volumetric flow of the liquid in the main line 5 that is present at the spray opening 6.

The bypass valve 13 is adjustable via the operator-controlled element 7. The latter serves for adjusting the free cross-sectional area of the bypass line 12. The pressure in the main line 5, in particular in the pressure chamber 10, in particular at the spray opening 6, can be regulated by adjusting the bypass valve 13. In the embodiments, the main line valve 8 can be switched between the open state and the closed state, and the bypass valve 13 can also be adjusted, via the operator-controlled element 7.

The pressure washer 1 is conceived in such a way that the bypass valve 13 adjusts the size of the free cross-sectional area of the bypass line 12 as a function of an adjusted position of the operator-controlled element 7. A signal is generated as a function of the adjusted position of the operator-controlled element 7, the bypass valve 13 being adjusted by virtue of the signal. In the embodiments here, this is an electromagnetic signal. However, it can also be provided that the signal is an electric signal. It can likewise be provided that the signal is a combination of an electric signal and an electromagnetic signal. In the embodiments, the electromagnetic signal is transmitted to the control unit 22 so as to emanate from the operator-controlled element 7. The control unit 22 transmits a further signal to the bypass valve 13. The signal transmitted from the control unit 22 to the bypass valve 13 is utilized for adjusting the free cross-sectional area of the bypass line 12 via the bypass valve 13.

The bypass valve 13 is advantageously adjustable via an actuator not illustrated. The bypass valve 13 can be adjusted via the actuator in such a way that a continuous adjustment of the size of the free cross-sectional area of the bypass line 12 is possible. The size of the free cross-sectional area is continuously adjustable via the operator-controlled element 7.

The pressure washer 1 is conceived in such a way that the bypass valve 13 in the non-activated state of the operator-controlled element 7 is adjusted in such a way that the free cross-sectional area of the bypass line 12 is at the maximum.

The operator-controlled element 7 is disposed on the spray unit 11. The operator-controlled element 7 is in particular disposed on the handgun. The opening of the main line valve 8 by the operator-controlled element 7 in the embodiments is performed mechanically.

It can also be provided that an electric signal is utilized for opening the main line valve 8. As soon as the operator-controlled element 7 is in the activated state—thus no longer in the non-activated state—a signal is transmitted to the main line valve 8. This signal has the effect that the main line valve 8 is transferred from the closed state to the open state. As long as the operator-controlled element is in the activated state, the signal which continues to be transmitted ensures that the main line valve 8 is in the open state.

It is understood that the foregoing description is that of the preferred embodiments of the invention and that various changes and modifications may be made thereto without departing from the spirit and scope of the invention as defined in the appended claims.

The invention claimed is:

1. A pressure washer comprising:

a connection for a source of liquid;

a high pressure pump;

a main line by way of which liquid is conveyable via said high pressure pump from said connection to a spray opening of said main line;

said main line having a suction chamber between said connection and said high pressure pump; said main line having a pressure chamber between said high pressure pump and said spray opening; and, a supplemental pump for adding an additive to the liquid, wherein the additive by way of said supplemental pump is feedable directly to said suction chamber of said main line upstream of said high pressure pump without first passing through a bypass line which fluidly connects said pressure chamber and said suction chamber.

2. The pressure washer of claim 1, wherein said supplemental pump has an outlet fluidically connected to said suction chamber.

3. The pressure washer of claim 2 further comprising:

a bypass valve disposed in said bypass line; and, said bypass line having a free cross-sectional area configured to be adjustable via said bypass valve for regulating a pressure in said pressure chamber.

4. The pressure washer of claim 1 further comprising a further operator-controlled element for controlling said supplemental pump.

5. The pressure washer of claim 4, wherein said further operator-controlled element is configured to influence a quantity of the additive fed to said main line.

6. The pressure washer of claim 4, wherein a delivery rate of said supplemental pump is adjustable via said further operator-controlled element.

7. The pressure washer of claim 4, wherein a power input of said supplemental pump is adjustable via said further operator-controlled element.

8. The pressure washer of claim 1, wherein a pump output of said supplemental pump is greater at a higher pressure in said main line upstream of said high pressure pump.

9. The pressure washer of claim 1, wherein said supplemental pump has an inlet fluidically connected to a container for the additive.

10. The pressure washer of claim 9 further comprising:

a supplemental valve configured to prevent the liquid from said main line advancing into the container.

11. The pressure washer of claim 10, wherein said supplemental valve is a constituent part of said supplemental pump.

12. The pressure washer of claim 1 further comprising:

a check valve; and, said check valve being configured to prevent the additive from leaking from said main line in a direction of a source of liquid via said connection for the source of liquid.

13. The pressure washer of claim 1, wherein said supplemental pump is a magnetic piston pump.

14. The pressure washer of claim 1, wherein the additive is a detergent solution.

15. A pressure washer comprising:

a connection for a source of liquid;

a high pressure pump;

a main line by way of which liquid is conveyable via said high pressure pump from said connection to a spray opening of said main line; and, a supplemental pump for adding an additive to the liquid, wherein the additive by way of said supplemental pump is feedable to said main line upstream of said high pressure pump;

a further operator-controlled element for controlling said supplemental pump;

a main line valve disposed in said main line and configured to adjust a free cross-sectional area of said main line;

an operator-controlled element;

said main line valve being operable via said operator-controlled element;

wherein said further operator-controlled element has an activated state in which an operation of said supplemental pump is possible; and, said supplemental pump being configured to be operated only if said further operator-controlled element is in said activated state and said operator-controlled element is simultaneously activated.

16. A pressure washer comprising:

a connection for a source of liquid;

a high pressure pump;

a main line by way of which liquid is conveyable via said high pressure pump from said connection to a spray opening of said main line; and, a supplemental pump for adding an additive to the liquid, wherein the additive by way of said supplemental pump is feedable to said main line upstream of said high pressure pump;

a further operator-controlled element for controlling said supplemental pump wherein said further operator-controlled element is configured to influence a quantity of the additive fed to said main line; and, wherein a plurality of stages in which the quantities of the additive fed to said main line differ are adjustable via said further operator-controlled element.

17. A pressure washer comprising:

a connection for a source of liquid;

a high pressure pump;

a main line by way of which liquid is conveyable via said high pressure pump from said connection to a spray opening of said main line;

a supplemental pump for adding an additive to the liquid, wherein the additive by way of said supplemental pump is feedable to said main line upstream of said high pressure pump;

a further operator-controlled element for controlling said supplemental pump;

a hand-guidable spray unit;

said spray opening being disposed on said hand-guidable spray unit; and, said further operator-controlled element being disposed on said hand-guidable spray unit.

* * * * *